United States Patent [19]
Morgos et al.

[11] Patent Number: 6,139,105
[45] Date of Patent: Oct. 31, 2000

[54] EASY ENTRY LATCH FOR SEAT RECLINER

[75] Inventors: Dorin Morgos, Madison Heights, Mich.; Mark L. Gleason, Crossville, Tenn.; Jerry W. Foster, Rochester Hills, Mich.

[73] Assignee: Dura Automotive Systems, Inc., Rochester Hills, Mich.

[21] Appl. No.: 09/287,151

[22] Filed: Apr. 6, 1999

[51] Int. Cl.[7] ....................................................... B60N 2/20
[52] U.S. Cl. ..................................... 297/378.12; 297/367
[58] Field of Search .................................... 297/365, 366, 297/367, 368, 378.1, 378.12

[56] References Cited

U.S. PATENT DOCUMENTS

| | | |
|---|---|---|
| 3,973,288 | 8/1976 | Pickles . |
| 3,999,247 | 12/1976 | Cremer ................................ 297/378.12 |
| 4,223,947 | 9/1980 | Cremer . |
| 4,295,682 | 10/1981 | Kluting et al. .................. 297/378.12 X |
| 4,634,182 | 1/1987 | Tanaka . |
| 5,058,240 | 10/1991 | Barda et al. . |
| 5,383,710 | 1/1995 | Premji . |
| 5,390,980 | 2/1995 | Premji et al. ....................... 297/378.12 |
| 5,414,897 | 5/1995 | Loewe . |
| 5,460,429 | 10/1995 | Whalen . |
| 5,466,048 | 11/1995 | Fowler . |
| 5,476,307 | 12/1995 | Whatlen . |
| 5,540,117 | 7/1996 | Hansel et al. . |

FOREIGN PATENT DOCUMENTS

| | | | |
|---|---|---|---|
| 51819 | 8/1974 | Australia ................................ | 297/367 |
| 2116249 | 9/1983 | United Kingdom .............. | 297/378.12 |

*Primary Examiner*—Peter R. Brown
*Attorney, Agent, or Firm*—Banner & Witcoff, Ltd.

[57] ABSTRACT

A latch mechanism, particularly for securing a pivoting member of a motor vehicle seat with respect to a fixed member is disclosed, comprising a sector rotatable about a sector pivot point and having a front wall. A release lever is rotatable about a release lever pivot point between a locked position and an easy entry position. A latch is rotatable about a latch pivot point and has a front face and a rear catch. When the release lever is in the locked position the release lever holds the latch so that the front face contacts the front wall at a contact angle of about 15 to 22 degrees. The contact angle is formed between a first line defined by the front wall and a second line perpendicular to a line between a contact point between the front face and the front wall. As the release lever rotates toward the easy entry position the release lever contacts the rear catch, urging the latch to rotate out of engagement with the sector. This permits the release lever and the latch to move with respect to the sector. The pivoting member can comprise a seat back assembly and the fixed member can comprise a seat base assembly.

10 Claims, 2 Drawing Sheets

EASY ENTRY LATCH FOR SEAT RECLINER

FIELD OF THE INVENTION

The present invention generally relates to latching mechanisms for securing pivoting members relative fixed members, and more particularly to latching devices for securing the position of a seat back of a motor vehicle with respect to a seat base.

BACKGROUND OF THE INVENTION

Recliner mechanisms have been used to releasably secure a seat back against a seat base in a motor vehicle. The seat back is typically adjustable for comfort by the recliner mechanism over a normal range of travel with respect to the seat base, and the seat base is rigidly affixed to a floor of the motor vehicle. Such a recliner mechanism can comprise a toothed pawl mounted to the seat base which engages a toothed sector assembly attached to the seat back. A comfort adjust mechanism moves the pawl out of engagement with the sector, permitting the sector (and therefore the seat back) to pivot.

An easy entry latch permits the seat back to be dumped, that is, rotated to a full forward end of the normal range of travel. The term easy entry, as used here, refers to the ability of a seat back to be pivoted so as to allow access behind the seat back, typically to a second row of seats or a rear compartment of a motor vehicle. U.S. Pat. No. 5,414,897 discloses a single component latch assembly that can be used as an easy entry latch for a vehicle seat, comprising a latch that engages a latch plate. The term single component refers to the fact that the latch is the component which engages the latch plate and the release handle is attached directly to the latch. Such designs can have problems with release efforts. That is, in some circumstances, high release efforts are required to rotate the latch out of engagement with the latching plate. It would be desirable to provide an easy entry latch mechanism for a vehicle seat where the seat back stays in position with respect to the seat base when subjected to rapid accelerations and decelerations as can be experienced in a motor vehicle, while maintaining reasonable release efforts to rotate the release handle.

In view of the foregoing, it is an object of the present invention to provide an easy entry latch mechanism which can resist unlatching in response to sudden acceleration or deceleration. It is an additional object of the present invention to provide an easy entry latch mechanism having relatively low release efforts. It is another related object of the present invention to provide such a latch mechanism that is insensitive to vibration and is highly reliable in operation.

SUMMARY OF THE INVENTION

In accordance with these and other objects, there is provided an easy entry latch mechanism that is capable of withstanding forces associated with rapid accelerations and decelerations while being disengageable with acceptable release efforts, comprising a release lever, a latch and a sector. The sector is rotatable about a sector pivot point and has a front wall. The release lever is rotatable about a release lever pivot point between a locked position and an easy entry position. The latch has a front face which contacts the front wall at a contact angle of about 15 to 22 degrees, and is rotatable about a latch pivot point. The contact angle is defined between first and second lines. The first line is defined by the front wall of the sector. The second line is defined by a line perpendicular to a line formed by a contact point between the front face and the front wall and the latch pivot point. The contact angle is optimized to limit chucking and reduce release efforts.

As the release lever is rotated to the easy entry position the release lever contacts a rear catch on the latch, urging the latch out of engagement with the sector. This permits the release lever and the latch to move with respect to the sector.

Typically the latch and release lever are affixed to a seat back assembly. This means that when the latch engages the sector, the seat back travels with the sector. A pawl mounted on the seat base can engage the sector to hold the sector. During comfort adjustment, the pawl disengages the sector, permitting the sector to rotate. During easy entry, the sector remains engaged with the pawl, holding a preselected position for the seat back until easy entry is completed and the latch reengages the sector.

From the foregoing disclosure and the following more detailed description of various preferred embodiments it will be apparent to those skilled in the art that the present invention provides a significant advance in the technology and art of latch mechanisms. Particularly significant in this regard is the potential the invention affords for reducing release efforts while maintaining high latching strength characteristics, and reducing problems associated with chucking. Additional features and advantages of various preferred embodiments will be better understood in view of the detailed description provided below.

Figure 1:
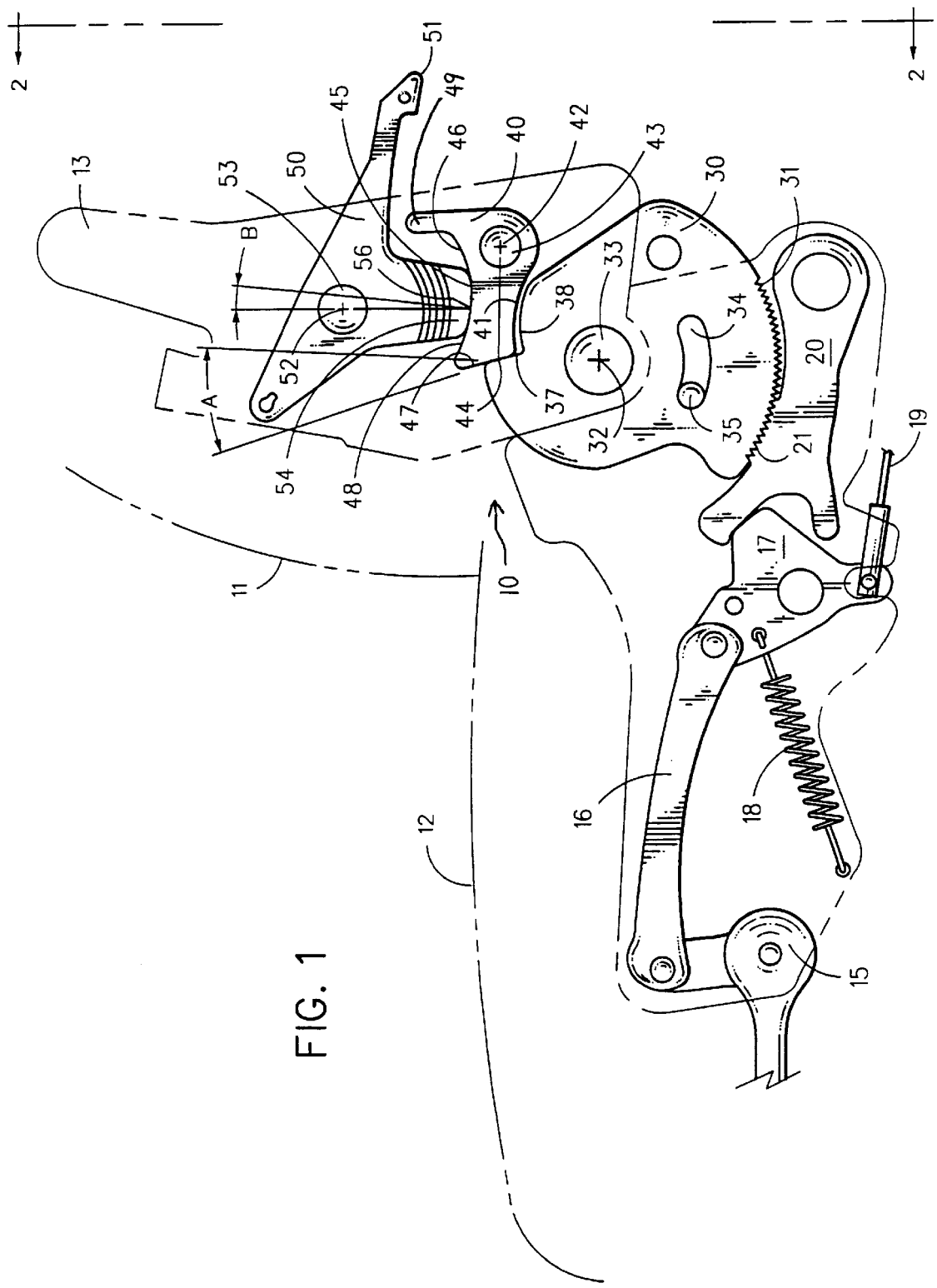
FIG. 1 is a schematic side elevation view, partially broken away, of an easy entry latch for a motor vehicle seat in accordance with a preferred embodiment, shown with a release lever in a locked position.

It should be understood that the appended drawings are not necessarily to scale, presenting a somewhat simplified representation of various preferred features illustrative of the basic principles of the invention. The specific design features of a latch mechanism as disclosed here, including, for example, specific dimensions of the surfaces of the latch and sector will be determined in part by the particular intended application and use environment. Certain features of the illustrated embodiments have been enlarged or distorted relative to others to facilitate visualization and clear understanding. In particular, thin features may be thickened, for example, for clarity of illustration. All references to direction and position, unless otherwise indicated, refer to the orientation of the latch mechanism illustrated in the drawings. In general, front or frontward refers to a left direction in the plane of the paper in FIG. 1, and rear, rearward or backwards refers to a right direction in the plane of the paper in FIG. 1.

DETAILED DESCRIPTION OF CERTAIN PREFERRED EMBODIMENTS

It will be apparent to those skilled in the art, that is, to those who have knowledge or experience in this area of technology, that many uses and design variations are possible for the easy entry latch mechanism disclosed here. The following detailed discussion of various alternative and preferred features and embodiments will illustrate the general principles of the invention with reference to a easy entry latch mechanism for use in a reclining motor vehicle single passenger seat. Other embodiments suitable for other applications, such as rear seats which accommodate more than one passenger, will be apparent given the benefit of this disclosure.

Figure 2:
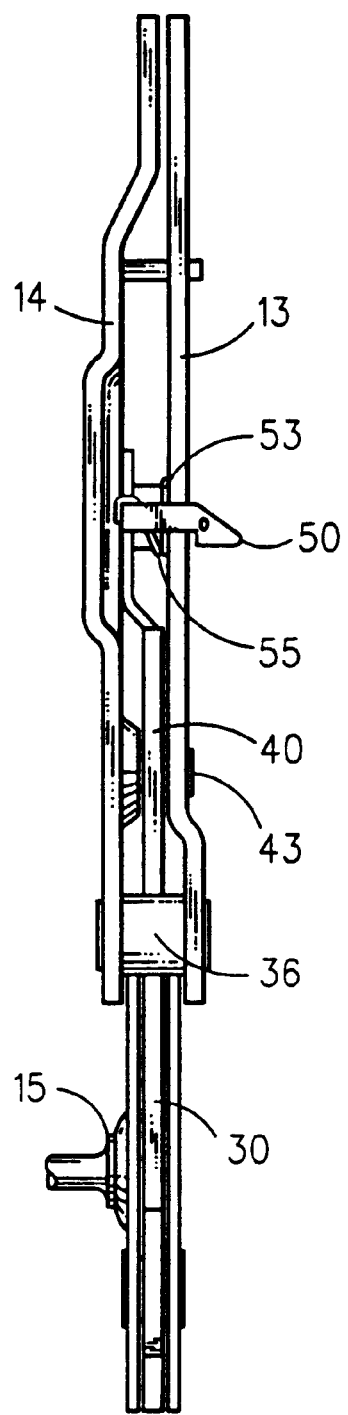
FIG. 2 is a rear elevation view taken along line 2—2 of FIG. 1, showing a spring which biases the release lever to the locked position.

Referring now to the drawings, FIGS. 1 and 2 show a seat recliner 10 for a motor vehicle seat in accordance with a preferred embodiment. The motor vehicle seat comprises a seat back assembly comprising a seat back 11 and a seat base assembly comprising a seat base 12, shown in phantom. The seat base assembly is affixed to a floor of the motor vehicle or other rigid structure (not shown), and the seat back assembly pivots with respect to the seat base assembly. The recliner 10 serves as a hinge connecting the seat back assembly to the seat base assembly. The seat recliner 10 is used for comfort adjustment of the seat back 11 with respect to the seat base 12. A comfort adjust lever 15 is affixed to the seat base assembly. Lever 15 may be actuated by a comfort adjust release handle in accordance with known designs. A link 16 connects the comfort adjust lever 15 to a cam 17. The cam 17 is urged by a cam spring 18 to engage a pawl 20 which in turn engages a sector 30. The pawl is mounted on the seat base assembly and the sector is mounted on the seat back assembly. The pawl 20 has pawl teeth 21 which engage corresponding teeth 31 on the sector 30 to secure the rotational position of the seat back assembly with respect to the seat base assembly. Operation of the comfort adjust lever 15 overcomes the force of the cam spring 18, rotating the cam to urge the pawl 20 out of engagement with the sector 30. Optionally a pair of recliners can be used, with one mounted on each side of the seat and connected by a slave cable 19 attached to the cam 17 of the first recliner so that the recliners operate substantially simultaneously.

Sector 30 is pivotable over a travel range defined by a slot 34, typically referred to as a banana slot. A banana slot rivet 35 or other suitable projection is mounted to one of the seat back sandwich plates 13, 14 and extends into the banana slot 34. The rivet 35 and slot 34 limit the travel range of the sector, and since the seat back is attached to the sector, this in turn limits the travel range of the seat back for comfort adjustment. A rear stop 36 (seen in FIG. 2) may also be provided to serve as an additional stop for the seat back 11, preventing the seat back from rotating forward even when all other latching mechanisms are disengaged. The sector 30 is rotatable about a sector pivot point 32 and is seated around a sector pivot 33.

Turning now to an easy entry mechanism for the seat recliner, a latch 40 engages the sector and a release lever 50 engages the latch. The latch 40 and release lever are mounted on the seat back sandwich plates 13, 14. Since the latch 40 and the release lever 50 are mounted on the seat back sandwich plates, the latch and release lever rotate with the seat back 12. Thus, during comfort adjustment the pawl 20 is disengaged from the sector 30, the sector rotates with the seat back, the latch 40 remains engaged with the sector, the release lever 50 remains engaged with the latch and the latch and release lever also rotate with the seat back. During easy entry, the latch is rotated out of engagement with the sector, and the release lever and latch rotate with the seat back 11 to a full forward position. However, during easy entry the sector remains locked with the pawl 20. Therefore, once easy entry is complete the seat back can be returned to the position it was in before easy entry.

The release lever 50 is rotatably mounted on the seat back sandwich plates 13, 14 about a release lever pivot point 52 and is seated around a release lever pivot 53. The release lever has a cam nose 54 which engages a top face 45 of latch 40. The release lever is rotatable between a locked position where the release lever holds the latch 40 and the latch locks against the sector 30, (as shown in FIG. 1) to an easy entry position. As the release lever rotates to the easy entry position the cam nose contacts a rear catch 49 of the latch, urging the latch out of engagement with the sector. This permits the seat back to rotate to the full forward position. Release lever spring 55 is visible from the rear view of FIG. 2. The release lever spring 55 is mounted to sandwich plate 13, and biases the release lever toward the locking position. That is, spring 55 urges cam nose 54 against the top face 45 of the latch 40. Release lever 50 has a release handle segment 51 which preferably rotates upwards, in a counter-clockwise direction as seen in FIG. 1. Thus, inadvertent contact with the release handle segment, caused by, for example, a person's foot pressing down on the release handle segment 51 will not disengage the easy entry latch.

Sector 30 has a front wall 37 extending to a top surface 38. The latch 40 is rotatable around a latch pivot point 42 and is seated around a latch pivot 43. The latch 40 has a front face 47 which contacts the front wall 37 at a contact angle A. The contact angle A between the latch and the sector is formed between two lines. The front wall 37 of the sector defines a first line. If front wall 37 is not flat, then the first line is the line tangent to the contact point 44 on the front wall 47. A second line is defined as the line perpendicular or normal to a line extending from the latch pivot point 42 to the contact point 44 between the latch front face 47 and the front wall 37. Latch 40 preferably engages sector 30 at contact point 44 so that there is a gap between bottom face 41 fo the latch and top wall 38 of the sector.

The optimum contact angle is restrained by several factors. If the contact angle is too small, chucking can occur and the efforts required to disengage the latch 40 from the sector 30 can be unacceptably high. These are problems that have been found in known designs. If, on the other hand, the contact angle is too large the latch may disengage the sector in response to sudden accelerations. Extensive analysis has identified that the optimum contact angle falls in the range of about 15 to 22 degrees, most preferably 18 to 22 degrees. In the embodiment shown in the drawings, contact angle A is 20.1 degrees. In prior two component easy entry latch designs, a contact angle of about 5.7 degrees was formed to ensure proper latching. Such designs have had problems with high release efforts and with meeting the high strength requirements at a given stamping stock thickness.

The cam nose 54 contacting the top face 45 of the latch forms second contact angle B. The contact angle B is formed between a pair of lines. One line is defined by a second contact point 56 between the cam nose and the latch top face 45, and the release lever pivot point 52. The other line is formed coplanar with and perpendicular to a tangent to the cam nose 54 at the second contact point 56. Preferably second contact angle B is about 5.4 to 6.0 degrees, most preferably about 5.8 degrees to provide good sliding interaction of the release lever and the latch. Preferably contact angle A is optimized so that the latch 40 can, in certain preferred embodiments, resist disengagement from the sector 30 without the additional locking force of the spring biased release lever.

The top face 45 of the latch 40 can comprise a pair of segments, with each segment having a radiused curve. A first segment has a constant first radius of curvature 46 extending to the rear catch 49 and a second segment has a constant second radius of curvature 48 extending from the first radius of curvature to the front face 47 of the latch 40. Preferably the first radius of curvature 46 is larger than the second radius of curvature 48 so that the second contact point is on the second radius of curvature. In one example the first radius of curvature 46 is approximately 34.2 mm and the second radius of curvature is approximately 42.6 nun. Such a design advantageously allows the cam nose to clear the latch during easy entry.

Of course, the actual components of the easy entry latch are not two-dimensional. It will be readily understood that the latch front face engages the front wall of the sector across the depth of each of the parts, forming a line of contact comprised of a series of contact points. Similarly, the pivot points and the contact points are in fact lines of contact which have a length equivalent to the depth of the corresponding parts. The contact point and the pivot points are shown on the visible side surfaces of the corresponding latch 40, release lever 50 and sector 30 seen in FIG. 1, and a line connecting the two refers to the coplanar points on these corresponding components. Further, some compression and deflection will, of course cause an area of contact in the general area of the contact point. It will be readily understood by those skilled in the art that the contact points include such lines and areas of contact.

Preferably the components of the easy entry latch mechanism are stamped or fineblanked. It is desirable to make the components as thin as possible while still meeting the high strength requirements of such seat recliner designs. This is so since the recliner mechanism takes up valuable seat space, and because tooling costs increase as the thickness of parts increase.

From the foregoing disclosure and detailed description of certain preferred embodiments, it will be apparent that various modifications, additions and other alternative embodiments are possible without departing from the true scope and spirit of the invention. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An easy entry latch mechanism for a seat comprising, in combination:

a sector rotatable about a sector pivot point and having a front wall;

a release lever rotatable about a release lever pivot point between a locked position and an easy entry position;

a latch having a top face, a front face and a rear catch, the latch being rotatable about a latch pivot point;

wherein the release lever in the locked position holds the latch so that the front face contacts the front wall at a contact angle of about 15 to 22 degrees, the contact angle formed between a first line defined by the front wall and a second line coplanar and perpendicular to a line between a contact point between the front face and the front wall and the latch pivot point; and wherein as the release lever is rotated to the easy entry position the release lever contacts the rear catch to urge the latch out of engagement with the sector, permitting the release lever and the latch to move with respect to the sector.

2. The easy entry latch mechanism of claim 1 wherein the contact angle is about 18 to 22 degrees.

3. The easy entry latch mechanism of claim 1 further comprising a spring biasing the release lever toward the locked position.

4. The easy entry latch mechanism of claim 1 further comprising a seat back and a seat base, wherein the seat back is pivotable with respect to the seat base around the sector pivot point.

5. The easy entry latch mechanism of claim 4 further comprising a pawl mounted on the seat base and having a toothed section which engages a toothed section of the sector when the pawl is in a locking condition, wherein the pawl is rotatable from the locking condition to a comfort adjustment position where the toothed section of the pawl does not engage the toothed section of the sector.

6. The easy entry latch mechanism of claim 5 wherein the sector is pivotable with respect to the seat base when the pawl is in the comfort adjustment position, and the sector is pivotable with the latch and the release lever.

7. The easy entry latch mechanism of claim 1 further comprising a cam nose formed on the release lever, the cam nose contacting the top face of the latch at a second contact point when the release lever is in the locked position, forming a second angle of about 5.4 to 6.0 degrees, the second angle formed between a third line coplanar with and perpendicular to a tangent to the cam nose at the second contact point and a fourth line defined between the contact point and the release lever pivot point.

8. The easy entry latch mechanism of claim 7 wherein the top face of the latch comprises a first segment having a first radius of curvature, and a second segment having a second radius of curvature, wherein the first radius of curvature is larger than the second radius of curvature and the second contact point is on the second radius of curvature.

9. The easy entry latch mechanism of claim 8 wherein the second radius of curvature extends to the front face of the latch.

10. The easy entry latch mechanism of claim 1 wherein the release lever comprises a release lever segment which rotates away from the sector as the release lever rotates from the locking position to the easy entry position.

\* \* \* \* \*